US012227966B2

(12) United States Patent
Kölliker et al.

(10) Patent No.: US 12,227,966 B2
(45) Date of Patent: Feb. 18, 2025

(54) KEY WITH A BUTTON FOR AN ELECTROMECHANICAL LOCKING DEVICE

(71) Applicant: dormakaba Schweiz AG, Wetzikon (CH)

(72) Inventors: Marcel Kölliker, Wetzikon (CH); Matthias Joerg, Wetzikon (CH); Dominik Laib, Wetzikon (CH)

(73) Assignee: DORMAKABA SCHWEIZ AG, Wetzikon (AT)

( * ) Notice: Subject to any disclaimer, the term of this patent is extended or adjusted under 35 U.S.C. 154(b) by 0 days.

(21) Appl. No.: 18/470,814

(22) Filed: Sep. 20, 2023

(65) Prior Publication Data

US 2024/0093532 A1 Mar. 21, 2024

(30) Foreign Application Priority Data

Sep. 21, 2022 (EP) .................................... 22196947

(51) Int. Cl.
*E05B 19/04* (2006.01)
*E05B 47/00* (2006.01)

(52) U.S. Cl.
CPC ...... *E05B 19/04* (2013.01); *E05B 2047/0084* (2013.01)

(58) Field of Classification Search
CPC ............ E05B 19/0005; E05B 19/0082; E05B 19/0088; E05B 19/04; E05B 19/046; E05B 2047/0084; E05B 2047/0094; E05B 2047/0095
See application file for complete search history.

(56) References Cited

U.S. PATENT DOCUMENTS

| | | | | |
|---|---|---|---|---|
| 4,562,712 A * | 1/1986 | Wolter | E05B 19/04 | 70/456 R |
| 4,922,736 A * | 5/1990 | Tanaka | E05B 17/103 | 70/277 |
| 5,730,013 A * | 3/1998 | Huang | E05B 19/00 | 362/116 |
| 6,182,484 B1 * | 2/2001 | Wolter | E05B 19/04 | 362/116 |
| 6,621,446 B1 * | 9/2003 | Chaillie | E05B 19/04 | 200/302.1 |

(Continued)

FOREIGN PATENT DOCUMENTS

| | | |
|---|---|---|
| DE | 10131500 A1 | 4/2003 |
| DE | 102012020916 A1 | 5/2014 |

(Continued)

OTHER PUBLICATIONS

European Search Report for European Application No. 22196947.0, dated Mar. 2, 2023, 30 pages with translation.

*Primary Examiner* — Christopher J Boswell
(74) *Attorney, Agent, or Firm* — CANTOR COLBURN LLP

(57) ABSTRACT

A key for an electromechanical locking device includes a key bow, and with the key bow includes a housing and an, in particular single, button. The housing includes an actuating section for actuating the button and a support section for supporting the actuating section, with the actuating section and the support section being configured in one piece with one another.

16 Claims, 8 Drawing Sheets

(56) References Cited

U.S. PATENT DOCUMENTS

| | | | | |
|---|---|---|---|---|
| 7,036,950 | B1 * | 5/2006 | Freeman | E05B 17/10 362/100 |
| 7,423,867 | B2 | 9/2008 | Yamamoto et al. | |
| 7,628,503 | B1 * | 12/2009 | Pumm | E05B 17/103 362/579 |
| 8,188,838 | B2 * | 5/2012 | Choi | E05B 19/04 340/539.11 |
| 9,611,673 | B1 * | 4/2017 | Vo | E05B 19/0082 |
| 9,642,220 | B1 * | 5/2017 | Vang | E05B 19/04 |
| 9,963,909 | B2 * | 5/2018 | Watanabe | E05B 19/046 |
| 2003/0200778 | A1 * | 10/2003 | Chhatwal | E05B 19/04 70/408 |
| 2012/0039052 | A1 | 2/2012 | Valles et al. | |

FOREIGN PATENT DOCUMENTS

| | | | |
|---|---|---|---|
| EP | 0844347 | A1 | 5/1998 |
| EP | 1899924 | B1 | 8/2017 |
| JP | 4300633 | B2 | 5/2009 |

* cited by examiner

A - A

B - B

C - C

KEY WITH A BUTTON FOR AN ELECTROMECHANICAL LOCKING DEVICE

CROSS-REFERENCE TO RELATED APPLICATIONS

This application claims the benefit of European patent application 22196947.0, filed on 21 Sep. 2022, the disclosure of which is incorporated herein by reference in its entirety.

TECHNICAL FIELD

The disclosure relates to a key with a button for an electromechanical locking device.

BACKGROUND

EP 1 899 924 B1 shows a previously known key for an electromechanical locking device. The previously known key comprises a key bow on which electronics are arranged between two housing shells. A key shank extends from the key bow for insertion into a locking device. There is an electrical contact located on the key shank.

Electronic keys with buttons are also known.

SUMMARY

The present disclosure indicates a key for an electromechanical locking device which ensures a simple design. This preferably results in comfortable and safe operation for the user.

This is achieved by providing the features of the independent claims. The dependent claims have preferred configurations of the disclosure as their subject matter.

The disclosure shows a key for an electromechanical locking device.

The electromechanical locking device is preferably a lock cylinder, in particular a double or half cylinder, a furniture cylinder or a padlock or a similar device. In particular, the locking device comprises a corresponding electronic device arranged in the locking device, which selectively locks and releases a rotation of a cylinder core and a driver in the locking device as a function of an electrical signal transmitted by the key. Alternatively, a mechanical coupling between the cylinder core and the driver can be made possible by the signal transmitted by the key. The electronic device preferably comprises a printed circuit board.

The key according to the disclosure has a key bow.

The key bow preferably comprises an electrical energy storage device and/or electronics. The energy storage device is designed in particular to power the electronics in the key. Additionally or alternatively, the energy storage device can be used to power the locking device. The electronics preferably comprise a light device, which will be described in detail below.

It is preferably provided that the electronics comprise a wireless communication module for wirelessly sending and/or receiving signals. This wireless communication module allows the key to communicate with a device. In particular, this is a wireless communication module that is designed for near-field communication, for example via Bluetooth or ultra-wideband.

The device is in particular a mobile device, for example a smartphone, tablet or laptop. In addition, the device can also be a stationary installed device, such as for example a terminal that is used for door and/or building control.

The electronics are preferably designed to communicate with the locking device in a wireless or wired manner. As will be described in detail below, the key preferably has at least one transmission element for this purpose, which communicatively connects the electronics on the key side to the electronic device on the locking device side.

The transmission element can be used to send electronic data that makes it possible to determine an authorization of a user for unlocking. For example, the transmission element can send an authorization code and/or an authorization time slot that is verified by the electronic device. Alternatively, the key can send an opening command to the locking device via the transmission element.

The communication can take place e.g. contact-bound.

With the key designed in this way, the device can communicate with the locking device via the key. Communication can take place directly, with the key immediately relaying the information from the transmitter, i.e. the device or the locking device, to the receiver, i.e. the locking device or the device. Furthermore, indirect, time-delayed communication is possible, in which the key stores the information and relays it with a time delay.

The electronics preferably comprise a printed circuit board.

According to the disclosure, the key bow comprises a housing.

The housing preferably forms a receiving space. The housing preferably receives the electronics and/or the energy storage device in the receiving space. In particular, the housing tightly encloses the electronics and/or the energy storage device.

The housing preferably comprises a first housing part and a second housing part. The receiving space for the electronics and/or the energy storage device is formed in particular between the first and second housing parts.

According to the disclosure, it is provided that the key has a button on or in the key bow. The key bow preferably comprises only a single button.

The button is preferably located inside the housing described. The button can be arranged on the printed circuit board. In particular, only a single button is provided, so that the user does not have the choice between a plurality of buttons, but can only press this one button.

According to the disclosure, the housing has an actuating section for actuating the button. This actuating section can be pressed by the user. This allows the button to be actuated. The actuating section thus serves to actuate the button.

The actuating section preferably curves inwards when it is actuated, so that the curve exerts pressure on the button. This actuates the button. For this purpose, the actuating section can comprise a button projection. The button projection can protrude from the rest of the actuating section in the direction of the button.

According to the disclosure, the housing comprises a support section in addition to the actuating section. In particular, any region of the housing that is not an actuating section—i.e., cannot be flexibly pressed against the button by the user—is the “support section” of the housing. Pressure by the user on the support section therefore does not result in the button being actuated.

The support section thus serves to support the actuating section. When the button is actuated, the actuating section and the support section preferably move towards one another.

According to the disclosure, it is provided that the actuating section and the support section are designed in one piece with one another. This achieves a simple design of the key.

This is preferably a monolithic design of the actuating section and support section, preferably as an injection molded part, particularly preferably as a one-component injection molded part. Particularly preferably, the first housing part comprises the actuating section, which is surrounded by the support section. For this purpose, the first housing part is designed in particular to be monolithic.

To further define the disclosure, the following imaginary axes and sides are preferably defined:

The key has a longitudinal axis. Furthermore, the key has a width axis and a thickness axis. The longitudinal axis, the width axis and the thickness axis are each perpendicular to one another.

Two broad sides are preferably defined on the key. The two broad sides are preferably opposite. The two broad sides are each intersected by the thickness axis. An end surface is particularly preferably located on at least one of the two broad sides. The end surface is in particular flat. One end surface is particularly preferably located on each of the two broad sides. One, preferably both, end surfaces are preferably perpendicular to the thickness axis.

Furthermore, the key bow preferably has two opposite narrow sides. The narrow sides are preferably perpendicular to the broad sides. Preferably, each narrow side is intersected by the width axis. The narrow sides are preferably each smaller than the broad sides.

In particular, when the button is actuated, the user presses the actuating section on one broad side and supports the key bow with an opposite finger or hand on the opposite broad side.

The housing preferably forms an end surface, in particular a flat end surface, of the key bow on at least one broad side. The actuating section preferably lies in this end surface. A part of the end surface can also be formed by the support section.

Furthermore, it is preferably provided that the button can be actuated by pressing the first and second housing parts against one another. In particular, the two opposite broad sides of the key bow are thereby pressed against one another.

The end surface is preferably surrounded, in particular surrounded over the entire circumference, by an edge section of the first housing part. The edge section is used in particular for at least indirectly fastening the first and the second housing part to one another.

It is preferably provided that the actuating section covers at least 20%, preferably at least 25%, particularly preferably at least 30% of the extension of the broad side. This is the broad side on which the actuating section is arranged, i.e. the broad side that can be pushed in to press the button.

Additionally or alternatively, it is preferably provided that the actuating section comprises at least 30%, preferably at least 40%, particularly preferably at least 50% of the extension of the end surface. This is the end surface on which the actuating section is arranged, i.e. the end surface that can be pushed in to press the button.

"Extension" is to be understood in particular as the projected area perpendicular to the thickness axis, whereby either the area of the entire key bow or the area of the end surface is decisive.

Due to the large extension of the actuating section, the user can operate the button safely and conveniently.

It is preferably provided that the actuating section merges into the support section within the end surface described.

The actuating section and the support section particularly preferably differ, in particular in the region of the end surface, at least partially in an internal wall thickness of the housing. The transition from one wall thickness to another wall thickness can occur abruptly at a step, or the wall thickness can change continuously or in a plurality of steps.

The transition from one wall thickness to the other wall thickness does not necessarily have to be at the transition from the actuating section to the support section. It is important that due to the changing wall thickness, a correspondingly flexible configuration of the housing is possible, so that the actuating section can be easily pressed inward in the direction of the button. Thus, the actuating region can have a changing wall thickness.

The support section can comprise an increased wall thickness. As a result, the support section does not curve, or does not curve to the same extent, as the actuating section.

In particular, the change in wall thickness is "internal", so that the external top surface of the key bow has a flat end surface and the difference in wall thickness is not visible.

Furthermore, it is preferably provided that the, in particular one-piece, support section forms the housing on the narrow side of the key bow. Viewing the key along the longitudinal axis or along the width axis (i.e. viewing at the front, back, or edge side), at least a part of the support section of the housing may be visible.

The key bow preferably comprises a frame. Preferably the housing is surrounded by the frame. In particular, the housing is received in the frame and is thus fixed in the frame. Particularly preferably, the frame encloses the housing over the entire circumference—with the exception of any key ring through-opening that can be formed between the housing and the frame.

The first and/or the second housing part can be surrounded by the frame.

The energy storage device and/or the electronics is/are preferably located in the frame. The energy storage device and/or the electronics is/are thus received in the frame.

The frame is in particular made of metal or plastic, in particular fiber-reinforced plastic.

The frame preferably extends around the thickness axis or an axis parallel to the thickness axis. The frame is preferably in the form of a closed ring; where ring-shaped does not limit the geometric shape of the frame. In particular, the frame can be rectangular or oval.

The frame encloses—when viewed without electronics, energy storage device and housing—a free space inside the frame. The free space is preferably open on both sides, in particular completely open. The electronics and/or the energy storage device, in particular with the housing, are arranged in this free space. As soon as the housing is mounted in the frame, the free space in the frame is filled by the housing.

The housing preferably forms a top surface of the key bow on each of the two opposite broad sides—that is, a surface that can be touched by the user, in particular to actuate the button. In particular, the end surfaces form a top surface of the key bow.

It is preferably provided that the support section is located partially in the frame.

It is preferably provided that the housing protrudes beyond the frame along the thickness axis at least on one side, preferably on both sides.

When the key is viewed along the longitudinal axis or along the width axis, at least a part of the support section of the housing can be seen—partially covered by the in particular circumferential frame.

It is preferably provided that the frame protrudes beyond the housing along the longitudinal axis and/or along the width axis.

The housing preferably has a support column to limit a travel upon actuation of the actuating section. This support column prevents the actuating section from being able to be pressed too hard on the button. The support column is formed in particular by a first support column part and a separately formed second support column part. These two support column parts meet when the actuating section is pressed.

In particular, the first support column part is located on the first housing part and the second support column part is located on the second housing part.

The actuating section is preferably designed in one piece, in particular monolithically, with one of the support column parts.

The printed circuit board preferably has a column recess. This can be a hole or a groove. The support column, for example at least one of the two support column parts, protrudes through this column recess. As a result, the support column can be arranged relatively close to the button to be protected.

In particular, it is provided that the electronics of the key are designed so that when the button is actuated, communication with the device, e.g. smartphone, begins. In particular, after the button is actuated, the electronics send a corresponding signal via the wireless communication module in order to establish communication with the device.

The actuation of the button thus serves to save electrical energy, because the user needs to actuate a button in order to start communication with the device.

The key preferably comprises a key shank. The key shank preferably extends from the key bow.

This key shank is designed to be inserted into the locking device and in particular to transmit torque to the locking device into which the key can be inserted. In particular, the key and the locking device are designed such that a torque can be transmitted to the locking device for moving a driver, in particular a locking lug, by rotating the key. A closing element, in particular a building door, cabinet door, can be unlocked or locked by rotating the driver.

It may be that the transmission of energy and/or data from the key to the locking device is limited to the time that the key is inserted into the locking device. In this way, the energy storage device can be used to power the locking device as long as the key is inserted into the locking device. The electronics on the key side can be communicatively connected to an electronic device on the locking device side by means of the transmission element, as long as the key is inserted into the locking device. Direct communication between the device and the locking device may be limited to the time that the key is inserted in the locking device.

The longitudinal axis extends in particular along the key shank. Accordingly, the key is inserted into and removed from the locking device along the longitudinal axis.

Furthermore, it is preferably provided that the key shank extends along the longitudinal axis, starting from a front side of the key bow. A rear side of the key bow is opposite this front side. In the region of the rear side there is preferably a key ring through-opening for attaching the key to a key ring. Preferably, the front side and the rear side are intersected by the longitudinal axis.

The frame can serve to transmit torque to the locking device.

Furthermore, it is preferably provided that the key shank is rigidly connected to the frame. In particular, the frame is composed of a first frame part and a second frame part. The key shank is preferably arranged rigidly on the first frame part.

In particular, this rigid arrangement means that the key shank is immovable relative to the frame. It is therefore preferably provided that the key shank cannot be folded in relative to the frame or removed from the frame. As a result, a relatively stable transmission of torque from the frame to the key shank and thus to the locking device is possible.

Furthermore, it is preferably provided that the frame comprises at least one grip region, which forms a top surface of the key bow for a user to grasp. As a result, the user can directly touch the frame—not just the housing—and thus transmit the required torque directly to the frame. In particular, the entire grip region has a top surface of the key bow for a user to grasp.

"Top surface" is to be understood in particular as a region of the frame that is exposed and can therefore be touched by the fingers or hand of the user.

In particular, the frame has at least two opposite grip regions, which are each spaced apart from the longitudinal axis, so that the torque can be transmitted with a corresponding lever. Particularly preferably, the key bow can be gripped such that the key bow is located between two fingers of the user and the two fingers thereby each rest on one of the two opposite grip regions.

It is particularly preferably provided that the frame is formed circumferentially on the top surface of the key bow. In this case, the frame is preferably designed to be completely circumferential, that is to say in the form of a closed ring, and is located along the entire circumference on the top surface of the key bow.

It is preferably provided that—when viewing along the width axis (i.e. when viewing the narrow side)—the at least one grip region extends over the entire length of the key bow, defined parallel to the longitudinal axis. As a result, the grip region preferably extends from the front side to the rear side of the key bow.

Only the top surface, which is spaced apart from the longitudinal axis, is preferably regarded as the grip region of the frame, so that torque can be transmitted over the entire grip region. The at least one grip region is particularly preferably a section of the frame which itself or whose tangent runs parallel or not at 90° to the longitudinal axis. The at least one grip region particularly preferably comprises the point of the key that is furthest away from the longitudinal axis. Furthermore, it is preferably provided that the at least one grip region does not intersect the longitudinal axis.

As described, it is preferably provided that the frame comprises two opposite grip regions. Both grip regions preferably intersect the same plane perpendicular to the thickness axis.

Furthermore, it is preferably provided that the frame is substantially rectangular or oval. In the case of the rectangular shape, parallel sides of the rectangular shape are preferably parallel and spaced apart from the longitudinal axis. These two sides form the two opposite grip regions.

Furthermore, it is preferably provided that the frame has a frame thickness of at least 3 mm, in particular at least 5 mm, parallel to the thickness axis. This provides a sufficient area that the user can grasp, in particular grip.

As described, the frame is preferably composed of the first frame part and the second frame part. As a result, the electronics and/or the energy storage device, in particular together with the housing, can be inserted into the frame in an assembly-friendly manner.

It is preferably provided that the first and the second frame part are connected in a force-fitting and/or form-fitting manner at at least one connection point. In particular, two opposing connection points are provided. At least one latching lug, which engages into a corresponding opposite latching point, is particularly preferably located at each connection point.

The at least one connection point, preferably the two connection points, is/are preferably spaced apart from the longitudinal axis. In particular, there is a connection point located in each grip region.

Furthermore, it is preferably provided that the at least one connection point, in particular the two connection points, is/are located in the front half of the key bow facing the key shank.

The key shank preferably comprises a key shank main body. The frame, in particular the first frame part, is preferably connected in one piece to the key shank main body.

The frame, in particular the first frame part, is particularly preferably manufactured monolithically with the key shank main body. This monolithic manufacture means in particular that the frame, in particular the first frame part, and the key shank main body are primary formed together; for example cast from metal or injection molded from plastic.

The key shank main body preferably extends over at least half the length of the key shank; particularly preferably over the entire length of the key shank. This ensures that a significant part of the key shank main body can be inserted into the locking device and the torque can be safely transmitted. The length of the key shank is defined as coaxial or parallel to the longitudinal axis.

The first frame part and the key shank main body are preferably designed together in the shape of a fork. This describes in particular that the first frame part comprises a front section from which two parallel front legs extend. The front section is preferably perpendicular to the longitudinal axis by itself or with a tangent. The two front legs are in particular spaced apart from the longitudinal axis. In particular, the two front legs each form part of the two opposite grip regions. The key shank main body preferably extends centrally between the two front legs from the front section of the first frame part. The key shank main body thereby extends in one direction and the two front legs in the opposite direction.

The frame can serve to arrange the first and the second housing part on one another.

The frame, in particular each frame part, preferably comprises at least one rail. The respective rail is designed in particular to arrange the first housing part and the second housing part on one another.

The edge section has in particular the described rail holder, which represents the connection to the frame.

In particular, there are a plurality of parallel rails located in the frame, with each housing part having an associated rail holder. By sliding the frame-side rails and the housing-side rail holders into one another, the two housing parts can be arranged and fixed relative to one another and relative to the frame.

The rail holder can be designed as a groove and the rail as a complementary projection that fits into the groove (also: protrusion). In the same way, in a reverse design, the rail can be designed as a groove and the rail holder as a complementary projection that fits into the groove (also: protrusion).

A seal is particularly preferably arranged between the two housing parts. In particular, the rails are designed in the frame so as to press the two housing parts towards one another and thereby compress the seal.

Furthermore, it is preferably provided that the first housing part forms a top surface of the key bow on the first broad side and the second housing part forms a top surface of the key bow on the opposite second broad side.

It is preferably provided that the key shank comprises at least the transmission element for transmitting electrical energy (also: power) and/or electronic data to the locking device. This at least one transmission element is, for example, a metal sheet, a wire or a printed circuit board.

At least two of the transmission elements are particularly preferably provided, with the transmission elements being arranged symmetrically so that the key can be used in the manner of a reversible key. In addition, the geometry of the key shank is preferably chosen so that the key can be used as a reversible key. In particular, for the reversible key-like usability, it is provided that the key shank is designed symmetrically in relation to a plane in which the longitudinal axis lies.

The at least one transmission element preferably extends from the electronics into the key shank. Inside the key bow, the transmission element preferably has a printed circuit board contact surface. The transmission element can be connected to a printed circuit board of the electronics at this circuit board contact surface in an electrically conductive manner. In the region of the key shank, the transmission element preferably has a locking device contact surface which is exposed and—when the key is inserted into the locking device—can be connected to the electronic device on the locking device side in an electrically conductive manner.

The key shank preferably comprises an insert element. This insert element is preferably made of plastic.

The insert element is preferably arranged on at least one of the two housing parts, preferably on both housing parts. For example, one of the two housing parts has a receiving groove into which the insert part can be inserted. This receiving groove is covered by the other housing part, so that the insert element is arranged, in particular clamped, between the two housing parts.

It is preferably provided that the insert element is fastened to the key shank main body, in particular in a force-fitting and/or form-fitting manner. A tongue and groove connection is particularly preferably provided between the insert element and the key shank main body.

The key shank main body particularly preferably has parallel shank legs spaced apart from one another. The insert element can be inserted between these two shank legs. In particular, the insert element is thereby connected to at least one of the two shank legs via the tongue and groove connection. At the front end of the key shank, the two shank legs can be connected to one another via a shank leg connection. The insert element thereby does not have to reach the foremost end of the key shank main body.

In the frame, in particular in the front section of the first frame part, there is preferably an insert element through-opening through which the insert element can be inserted into the key shank from the inside of the frame to the outside.

The insert element preferably comprises the at least one transmission element. In particular, the at least one transmission element is embedded in the insert element.

The key preferably comprises a socket, in particular designed as a USB-C connection. The socket is designed to charge the energy storage device and/or to connect the cable to the electronics. The electronics particularly preferably comprise a printed circuit board on which the socket is arranged.

The frame, in particular the second frame part, preferably has a frame socket opening. The socket for a corresponding plug is accessible through this frame socket opening. The socket itself does not have to extend into the frame socket opening. Rather, it is preferably provided that the socket does not extend into the frame socket opening, but is merely arranged in the housing.

One of the two housing parts preferably has an enclosing housing socket opening for the socket. This enclosing housing socket opening is preferably closed over the entire circumference, so that the socket is enclosed over the entire circumference by only one of the two housing parts. As a result, the sealing of the two housing parts or the sealing towards the socket is configured in a simple manner.

As mentioned, the key can comprise the key ring through-opening for attaching the key to a key ring, in particular for receiving a key ring. This key ring through-opening is located in particular between the frame and the housing, preferably on the rear side of the key bow.

Furthermore, it is preferably provided that the electronics are designed such that insertion and/or removal of the key shank into/from the locking device causes the electronics to perform an action, for example waking up the electronics and/or establishing communication with the device. This can also save energy.

Furthermore, it is preferably provided that the key bow of the key comprises a light device, with the electronics being designed to actuate the light device to reproduce at least one item of information in a luminous manner. This information can be a state of the key, for example. Furthermore, the information can relate to the locking device if the key is inserted into the locking device. In addition, the information can relate, for example, to the wireless communication connection between the key and the device, e.g. smartphone.

The light device can be designed to display, in particular differently, a communication setup and/or communication with the device.

The light device in the key bow is designed in particular to light up in at least two colors. The light device particularly preferably comprises at least one light element. This light element is preferably a single LED. The individual light element is designed in particular to emit at least two, preferably at least three, particularly preferably at least four colors. For example, the light element is an RGB LED. This LED can basically light up in red, green or blue and mix the colors so that white light can also be generated with it, for example.

It is preferably provided that the electronics are designed to represent different information using different patterns by actuating the light device.

The respective “pattern” is characterized by the color and/or the flashing pattern and/or the light intensity. Two different patterns thus differ in color and/or in the flashing pattern and/or in the light intensity.

It is preferably provided that the electronics are designed to represent different information about the key using different patterns by actuating the light device.

Furthermore, it is preferably provided that the electronics are designed to represent different information about the locking device using different patterns by actuating the light device.

As described, the key is designed for wireless communication connection with the device, in particular by way of the wireless communication module of the electronics. The electronics are preferably designed to display a search for a communication connection and/or an existing communication connection by way of the light device, in particular the light element, by actuating the light device. This “search for a communication connection” or the “existence of a communication connection” thereby forms the “information” that is displayed via the light device.

As described, the key can comprise the electrical energy storage device. The electronics are preferably designed to represent a charge status of the energy storage device as information by actuating the light device, in particular by way of the light element.

The key preferably has an interface, for example the socket described, for charging the energy storage device. The electronics are preferably designed to represent a charging process and/or an end of the charging process as information by way of the light device, in particular by way of the light element, by actuating the light device. It is particularly preferably provided that the representation is limited to the time in which the interface is connected to a power source.

Furthermore, it is preferably provided that the electronics are designed to represent at least one of the following errors as information by way of the light device, in particular the light element, by actuating the light device:

The error could be a faulty locking device. For example, the key can output a corresponding signal via the light device that prompts the user to look up the specific error on the device (e.g. smartphone).

Similarly, a faulty key and/or disrupted communication to the device can be displayed.

Furthermore, it is preferably provided that the electronics are designed to actuate the light device, in particular the light element, after a trigger event, to reproduce the at least one item of information in a luminous manner. The trigger event can thereby be at least one of the following events: pressing the described button of the key; and/or inserting the key into the locking device; and/or removing the key from the locking device; and/or connecting the interface to the power source.

It is also preferably provided that the electronics are designed to represent different patterns—that is, different colors and/or different flashing patterns and/or different light intensities—triggered in succession by one, in particular single, trigger event by actuating the light device. In particular, different information about the key and/or the locking device can thereby be represented by the different patterns.

Furthermore, it is preferably provided that the electronics are designed to actuate the light device to represent a charge status of the energy storage device after the key has been inserted into the locking device, with the representation of the charge status being one item of information from a plurality of items of information that is represented after the key has been inserted.

Furthermore, it is preferably provided that the key can be configured in such manner that at least part of the information that can be represented by the light device is not represented by the light device, in particular permanently, with the configuration being able to be stored in the electronics. This makes it possible, for example, for certain information or its representation to be deactivated for certain users or certain applications in order to save energy and not overwhelm the user.

It is preferably provided that at least one light guide is arranged in the housing of the key. Such a light guide comprises, for example, of appropriate plastic or glass and directs the light, for example from the LED on the printed circuit board, to the outside so that it is visible to the user.

It is preferably provided that the light device, preferably the light element, lights up through the light guide towards the broad side of the key.

Furthermore, it is preferably provided that the light device, preferably the light element, lights up through the light guide beyond the frame in the direction of the key shank.

Furthermore, it is preferably provided that the light device, in particular the light element, is arranged within the free space described, which is enclosed by the frame; in particular, the light device is located on the printed circuit board of the key.

The light guide is preferably located at least partially in the actuating section described, which is designed to be flexible in such manner that it can be pushed in to actuate the button on the key.

The light guide described above is particularly preferably a first light guide and a second light guide is also provided. The two light guides can also be combined in one component, so that ultimately there is a first light guide section and a second light guide section. The first light guide is arranged for emission on the first broad side of the housing. The second light guide is arranged for emission on the second broad side of the housing.

In particular, it is provided that light can be emitted, in particular synchronously, by the light device through the first and the second light guide. For this purpose, the light device can have a light element that feeds into both light guides. Alternatively, the light device can have two synchronously actuated light elements (for example two LEDs), with one light element in each case feeding into one of the two light guides.

Furthermore, it is preferably provided that the electronics are designed to actuate the light device in order to represent contrasting information about mutually exclusive states using different patterns, with the patterns differing in particular in the flashing pattern and/or in the color. Such mutually exclusive states are, for example, "communication connection active" and "communication connection not active".

In particular, it is thereby provided that the patterns for the two contrasting items of information differ both in the flashing pattern and in the color. As a result, color-blind people can recognize these two mutually exclusive states using only the flashing pattern.

Furthermore, it is preferably provided that the light intensity of the light device can be varied by the electronics as a function of the time of day and/or the ambient lighting.

The disclosure also comprises an arrangement. The arrangement comprises the key described and the electromechanical locking device described.

The electromechanical locking device is preferably the lock cylinder or a similar device into which the key can be inserted. In particular, the key and the locking device are designed such that a torque can be transmitted to the locking device for locking or unlocking the locking device by rotating the key. In particular, the locking device comprises a corresponding electronic device arranged in the locking device, which selectively locks and releases a rotation of the key in the locking device as a function of an electrical signal transmitted by the key.

The key is designed in particular to be able to be inserted into the locking device with its key shank and to transmit a torque to the locking device. Furthermore, it is thereby preferably provided that the at least one transmission element is designed for the transmission of power and/or data to the locking device.

Furthermore, the arrangement can comprise the device described, with the wireless communication module of the electronics of the key being designed for data exchange with the device.

BRIEF DESCRIPTION OF THE DRAWINGS

The disclosure will now be described further on the basis of an exemplary embodiment, in which is shown.

DETAILED DESCRIPTION OF THE DRAWINGS

The design of a key 1 according to an exemplary embodiment is explained in detail below on the basis of FIGS. 1 to 10. Unless otherwise stated, reference is always made to all figures.

Figure 1:
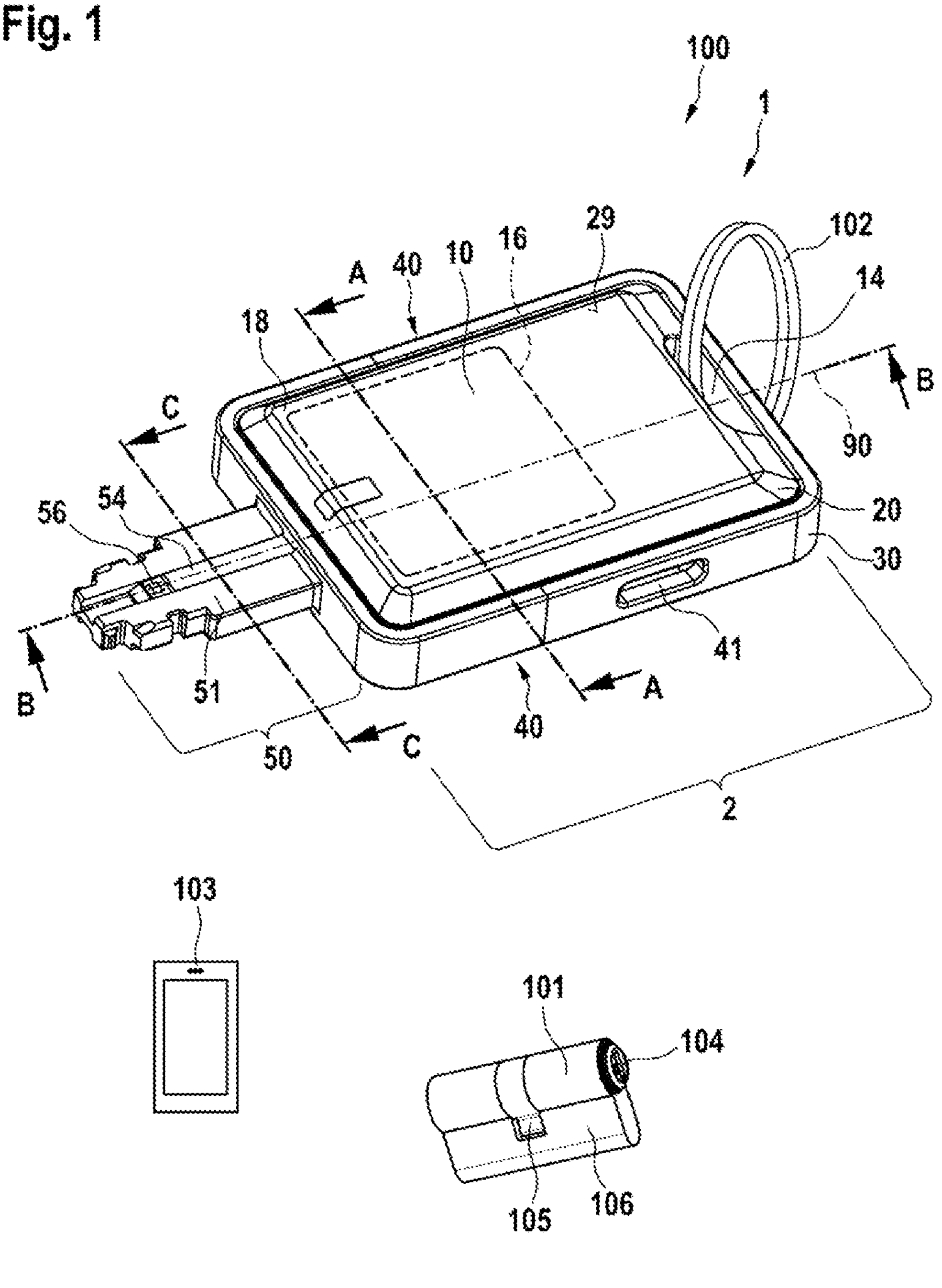
FIG. 1 a schematic view of an arrangement according to the disclosure with a locking device, device and key according to the disclosure in accordance with an exemplary embodiment, FIG. 2 an exploded representation of the key according to the disclosure in accordance with the exemplary embodiment, FIG. 3 a view of a narrow side of the key according to the disclosure in accordance with the exemplary embodiment, FIG. 4 a view of a broad side of the key according to the disclosure in accordance with the exemplary embodiment, FIG. 5 the section A-A marked in FIG. 1, FIG. 6 the section B-B marked in FIG. 1, FIG. 7 the section C-C marked in FIG. 1, FIG. 8 a detail of the key according to the disclosure in accordance with the exemplary embodiment, FIG. 9 electronics and a light device of the key according to the disclosure in accordance with the exemplary embodiment, FIG. 10 a state during assembly of the key according to the disclosure in accordance with the exemplary embodiment, FIG. 11 an assembly method according to the disclosure, and FIG. 12 different light patterns for the key according to the disclosure in accordance with the exemplary embodiment.

FIG. 1 shows the key 1 in an isometric view together with a locking device 101 and a device 103. The key 1 with the locking device 101 forms an arrangement 100. This arrangement 100 can also include the device 103. In addition, a key ring 102 can be arranged on the key 1.

The locking device 101 is a lock cylinder with a corresponding electronic device, as explained in the general part of the description. The device 103 is a mobile device or a stationary terminal, also as defined in the general part of the description.

The key 1 comprises a key bow 2 and a key shank 50. The key shank 50 is used to insert into the locking device 101. If there is an electronic access authorization, the key 1 can rotate a cylinder core 104. If, on the other hand, there is no electronic access authorization, the cylinder core 104 cannot be rotated in a locking device housing 106. A locking element, not represented, of the locking device 101 is prevented by an electromechanical actuator, not represented, of the locking device 101 from leaving a connecting position between cylinder core 104 and locking device housing 106.

Thus the key 1 cannot be rotated in the locking device 101 either. A rotation of the key 1 in the locking device 101 is thus locked.

If there is an electronic access authorization, a driver 105, which is designed as a locking lug, can be rotated with the cylinder core 104. For this purpose, the electromechanical actuator has been operated, which allows the locking element to be withdrawn from the connecting position. A building door can be unlocked via the driver 105.

The key bow 2 is formed by a housing 10 and a frame 30. The frame forms a free space 44 open on both sides (see FIG. 10) for arranging the housing 10. As soon as the housing 10 is mounted in the frame, the free space 44 in the frame 30 is filled by the housing 10. The frame 30 surrounds the housing 10 like a frame.

Figure 3:
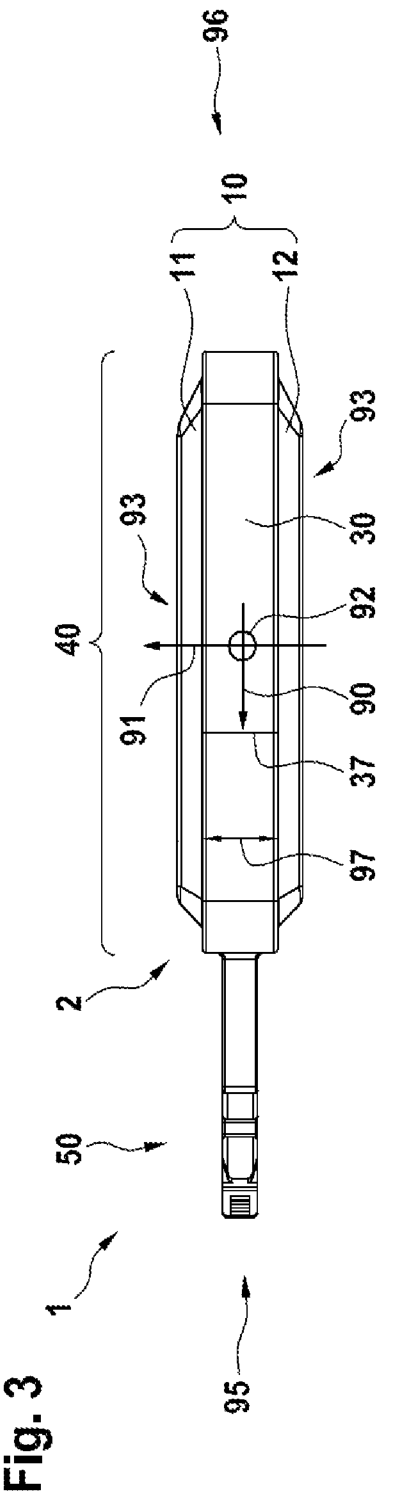
Figure 4:
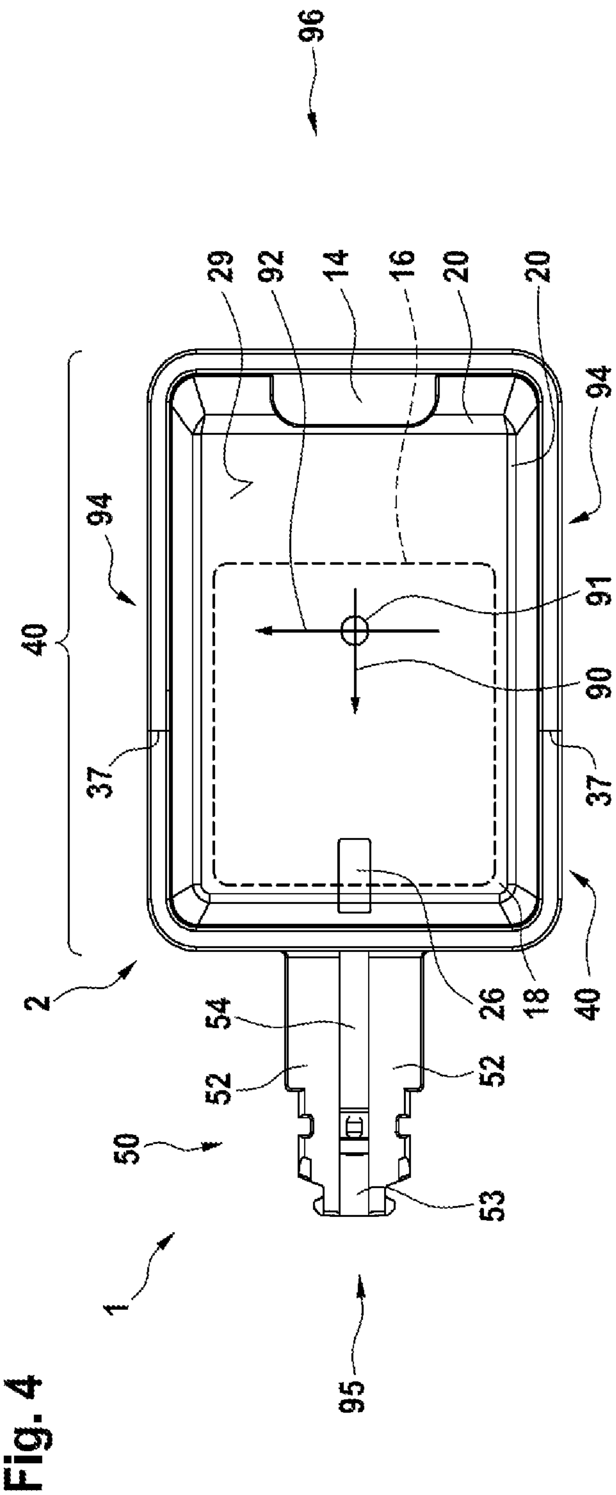

To define the disclosure, axes and sides are used, which are in particular illustrated in FIGS. 3 and 4. Accordingly, the key shank 50 extends along a longitudinal axis 90. A thickness axis 91 and a width axis 92 are perpendicular to the longitudinal axis 90. The key bow 2 has two opposite broad sides 93. These two broad sides 93 are intersected by the thickness axis 91. Furthermore, the key bow 2 has two opposite narrow sides 94. The narrow sides 94 are intersected by the width axis 92.

The key shank 50 is located on a front side 95 of the key bow 2. A rear side 96 is opposite this front side 95. A key ring through-opening 14 for the key ring 102 can be located on this rear side 96. The front side 95 and the rear side 96 are intersected by the longitudinal axis 90.

A frame thickness 97 of the frame 30 is defined parallel to the thickness axis 91. In the exemplary embodiment shown, the frame 30 has this frame thickness 97 at every point.

The representation in FIG. 3 also shows that the housing 10 protrudes beyond the frame 30 on both sides, i.e. on both broad sides 93, when viewed along the longitudinal axis 90 or the width axis 92.

The top view in FIG. 4 shows a view along the thickness axis 91. It can be seen that the frame 30 protrudes beyond the housing 10 along the longitudinal axis 90 and along the width axis 92—that is to say over the entire circumference. The frame 30 is thus formed circumferentially on the top surface of the key bow 2. Here, the frame 30 is designed to be open in the direction of the thickness axis 91 in the direction of the thickness axis 91. The broad sides 93 of the key bow 2, to be more precise, the top surfaces of the broad sides 93, are thus formed by the housing 10 and the frame 30.

The housing 10 is composed of a first housing part 11 and a second housing part 12. Each housing part 11, 12 has a rail holder 13 in each case. Corresponding rails 43 of the frame 30 are inserted into this rail holder 13 in order to arrange the two housing parts 11, 12 on one another and to seal the housing tightly. The frame surrounds both housing parts 11, 12 here like a frame.

In the housing 10, in particular in the second housing part 12, there is a housing socket opening 15 for a socket 74.

According to the disclosure, the key 1 comprises a button 73.

Figure 5:
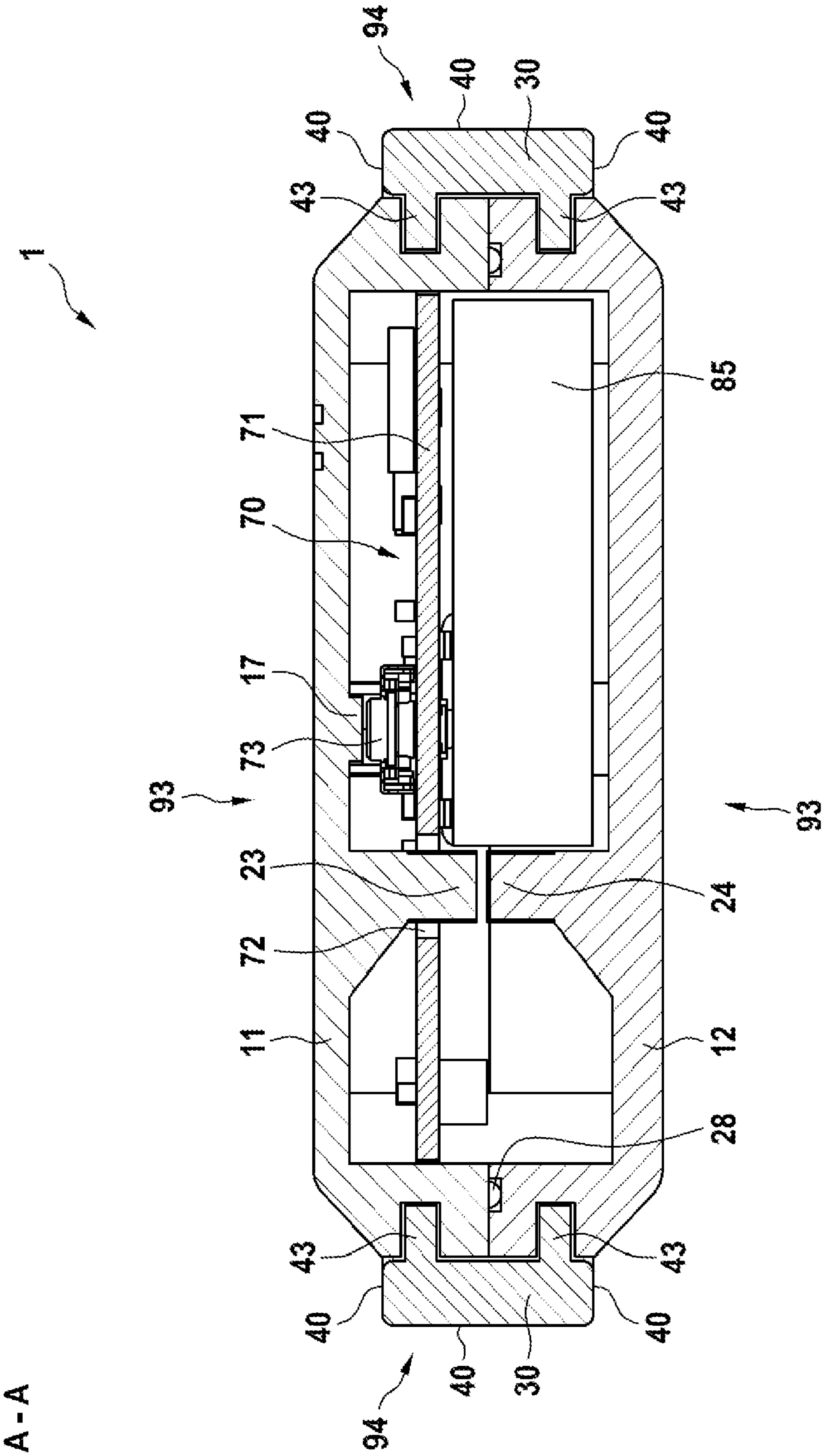

For example, the section A-A in FIG. 5 shows a button projection 17 on the inside of the first housing part 11. This button projection 17 can be pressed on the associated button 73. For this purpose, the user presses the two housing parts 11, 12 against each other.

The key bow 2 has a relatively large actuating section 16 which is designed to be flexible in such manner that it can be pushed in by the user to actuate the button 73. The user thereby does not have to look for a specific, small spot on the key bow 2 in order to actuate the button 73, but can press the relatively large actuating section 16. The button projection 17 is arranged on the actuating section 16. This makes it easier to operate button 73.

For example, the views in FIG. 1 and FIG. 4 illustrate that a relatively large area of the first housing part 11 is designed as an actuating section 16. This actuating section 16 is surrounded all around by a support section 18. When actuated, the actuating section 16 curves in relation to the support section 18. Any region of the first housing part 11 that does not form the actuating section 16 is assigned to this support section 18. Pressure on the support section 18 does not result in the button 73 being actuated.

According to the disclosure, the actuating section 16 and the support section 18 are designed in one piece. In this exemplary embodiment, the actuating section 16 and the support section 18 are formed monolithically. The actuating section 16 and the support section 18 together form the first housing part 11. The first housing part 11 is e.g. an injection molded part made of plastic. As a result, the key 1 is easy to manufacture.

In particular, the first housing part 11 has a flat end surface 29 on one of the two broad sides 93. This flat end surface 29 is largely formed by the actuating section 16. At least a rear part of the flat end surface 29 is designed as a support section 18. Thus, the actuating section 16 and the support section 18 together form the end surface 29 of the first housing part 11. In addition, the first housing part 11 comprises an edge section 20 which extends around the flat end surface 29. This edge section 20 is also part of the support section 18. The support section 18 thus forms the first housing part 11 on the narrow sides 94.

The edge section 20 has the rail holder 13 of the first housing part 11. Thus, the support section 18 is partially in the frame.

The actuating section 16 occupies at least 20%, preferably 25%, particularly preferably 30% of the spatial extension of the broad side 93. The spatial extension here means the extension perpendicular to the thickness axis 91. That is to say in a top view in the direction of the thickness axis 91 according to FIG. 4, in which the frame 30, the edge section 20 and the flat end surface 29 together form the broad side 93, the actuating section 16 occupies at least 20%, preferably 25%, particularly preferably 30% of the visible area.

The actuating section 16 occupies at least 30%, preferably at least 30%, particularly preferably 50% of the spatial extension of the end surface 29. The spatial extension here means the extension perpendicular to the thickness axis 91 (see FIG. 4).

Figure 6:
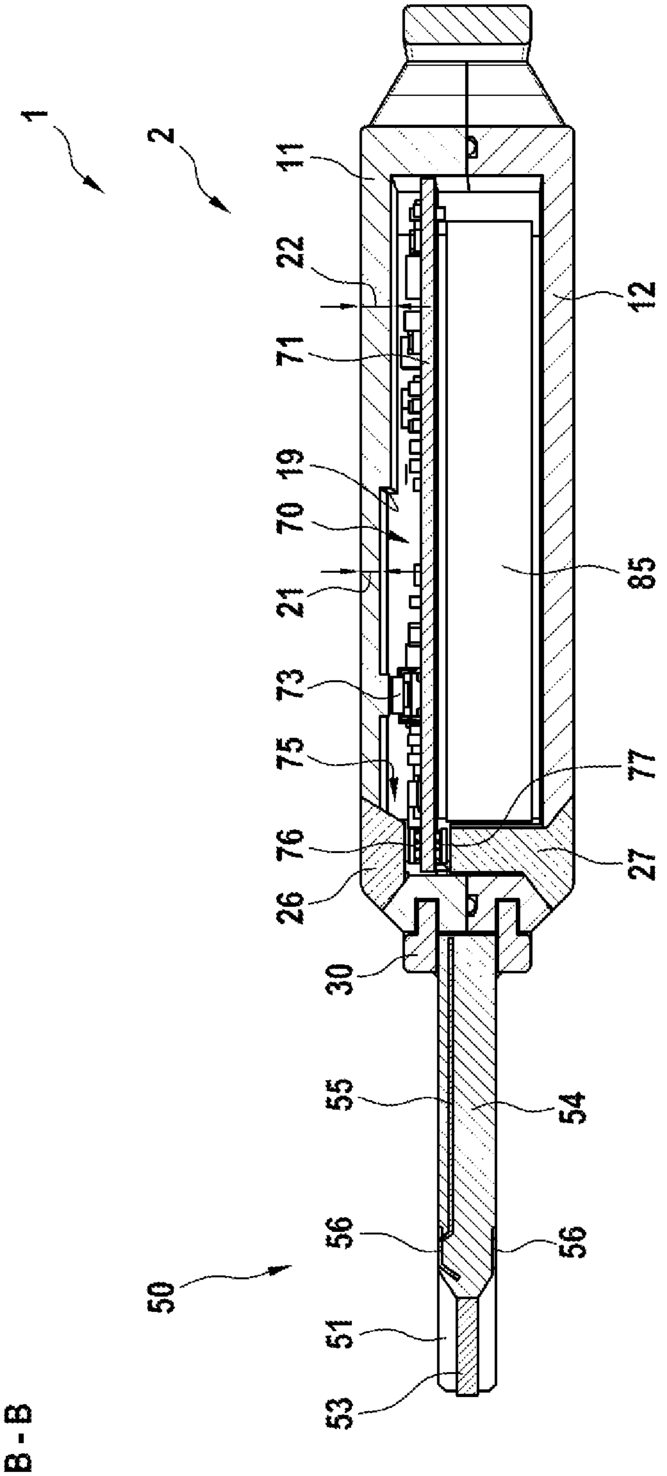
Figure 8:
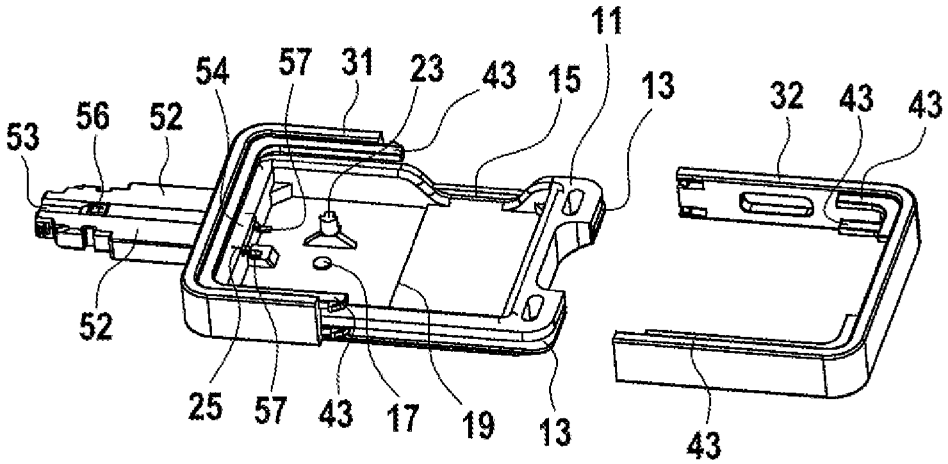

In order to achieve a correspondingly flexible configuration of the actuating section 16, the flat end surface 29 can have different wall thicknesses. In particular, the representations in FIGS. 6 and 8 show that a first, thin wall thickness 21 and a second, thicker wall thickness 22 are provided in the region of the end surface 29. In the exemplary embodiment shown, the two wall thicknesses 21, 22 merge into one another with a step 19. Alternatively, a plurality of steps or a continuous change in the wall thickness can also be provided here.

The step 19 can, but does not have to, form the boundary between the actuating section 16 and the support section 18. It is also conceivable that part of the end surface 29 with the wall thickness 22 is part of the actuating section 16 since pressing on this region causes the button 73 to be actuated.

In order that the two housing parts 11, 12 cannot be pressed too far or too hard against one another, a support column is provided, which is formed from a first support column part 23 and the inside of the first housing part 11 and a second support column part 24 on the inside of the second housing part 12. When the actuating section 16 is pushed in, the two support column parts 23, 24 meet to form the support column.

Electronics 70 of the key 1 are located in the key bow 2, inside the housing 10 and thus surrounded by the frame 30 and the housing 10. The electronics 70 have the printed circuit board 71, which is represented in detail in FIG. 9.

The button 73 is located on the printed circuit board 71 and can be pressed by the actuating section 16, in particular via the button projection 17.

A column recess 72 is located relatively close to the button 73, here as a hole. The support column, formed by the two support column parts 23, 24, protrudes through this column recess 72.

For example, FIG. 8 shows that the first housing part 11 has a receiving groove 25 for inserting an insert element 54. This makes it possible to arrange the insert element 54 on the housing 10.

Furthermore, the housing 10 comprises a first light guide 26 on one broad side 93 and a second light guide 27 on the opposite broad side 93. The two light guides 26, 27 are each arranged to emit light on the associated broad side 93 and beyond the frame 30 in the direction of the key shank 50. The light guides 26, 27 can be produced, for example, with the rest of the housing 10 using a two-component injection molding process.

Figure 2:
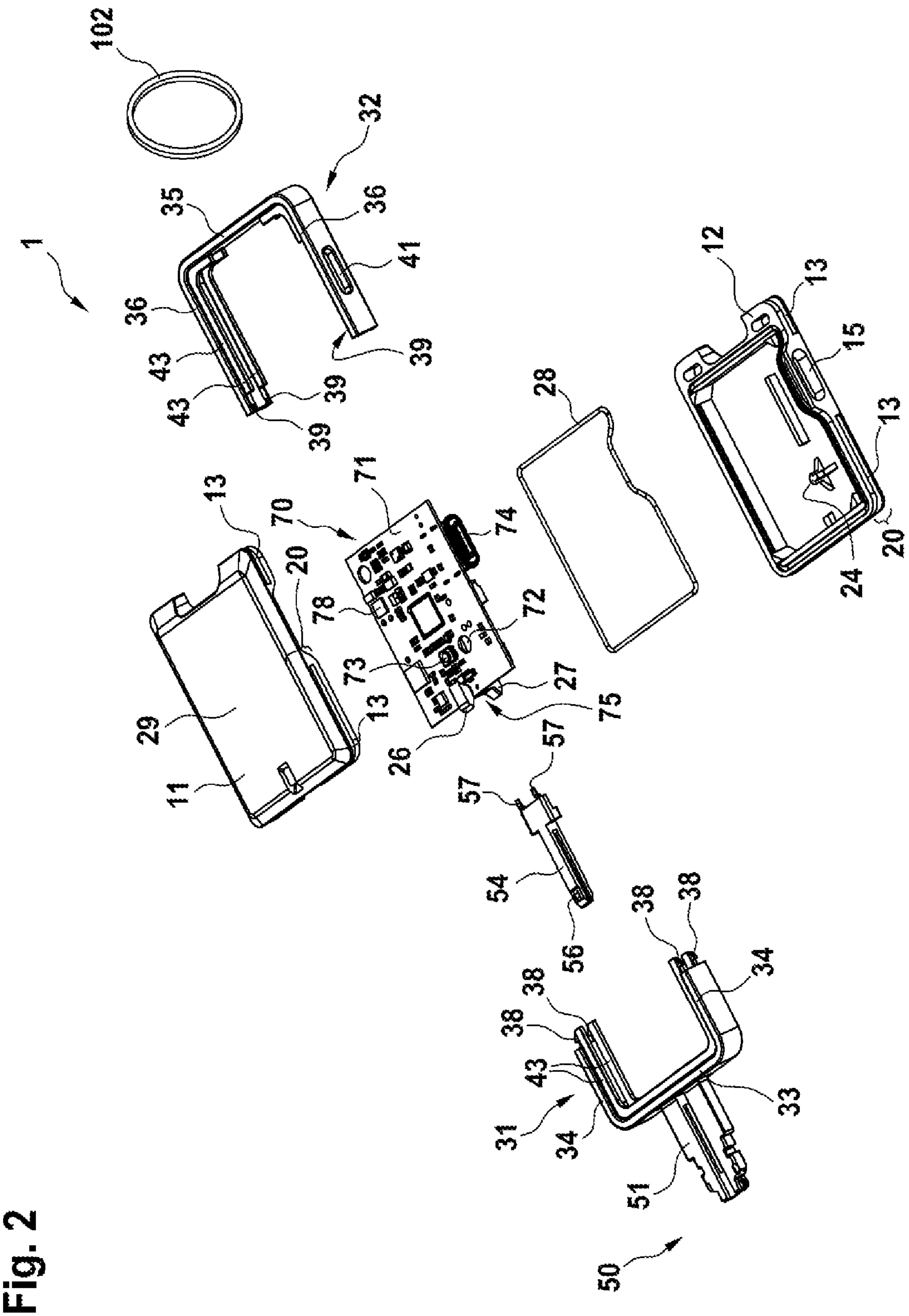

The exploded representation in FIG. 2 shows that a seal 28 can be inserted between the two housing parts 11, 12. Alternatively, this seal 28 can also be part of one of the two housing parts 11, 12, for example by a two-component injection molding process.

The frame 30 of the key bow 2 is formed by a first frame part 31 and a second frame part 32.

The first frame part 31 has a front section 33. The key shank 50, in particular a key shank main body 51, is located on this front section 33. This key shank main body 51 is formed monolithically together with the first frame part 31, for example cast together from metal.

Two front legs 34 of the first frame part 31 extend from the front section 33 in the direction of the rear side 96. As a result, the first frame part 31 is formed in the shape of a fork together with the key shank main body 51.

The second frame part 32 is designed to be U-shaped and thereby comprises a rear section 35 parallel to the front section 33. Two parallel rear legs 36 extend from this rear section 35 in the direction of the front side 95.

The two frame parts 31, 32 are connected to one another via two connection points 37. Each connection point 37 has two latching lugs 38 and two associated opposite latching points 39. Through these connection points 37, the two frame parts 31, 32 are connected to one another in a form-fitting and force-fitting manner.

The frame 30, in the exemplary embodiment shown the second frame part 32, has a frame socket opening 41 through which the socket 74 is accessible.

The frame 30 has a grip region 40 on each of the two narrow sides 94. The two grip regions 40 each form a top surface of the key bow 2 which can be gripped by the user in order to rotate the key 1 in the locking device 101. The torque can be transmitted directly to the key shank 50 and from there to the cylinder core 104 of the locking device 101 through the grip regions 40, which are located directly on the frame 30. There are no undesired stresses on the housing 10.

In the exemplary embodiment shown, the two grip regions 40 extend parallel and spaced apart from the longitudinal axis 90. In particular, the two grip regions 40 are formed by the two front legs 34 and the two rear legs 36.

The two grip regions 40 extend over the entire length of the key bow 2.

As already described, the key shank 50 comprises the key shank main body 51 which is a monolithic component of the first frame part 31. Thus, the key shank 50 and the frame 30 are rigidly connected to each other.

The key shank main body 51 has two shank legs 52 spaced apart from one another and a shank leg connection 53. The shank leg connection 53 connects the two shank legs 52 to one another at the front end of the key 1.

Figure 7:
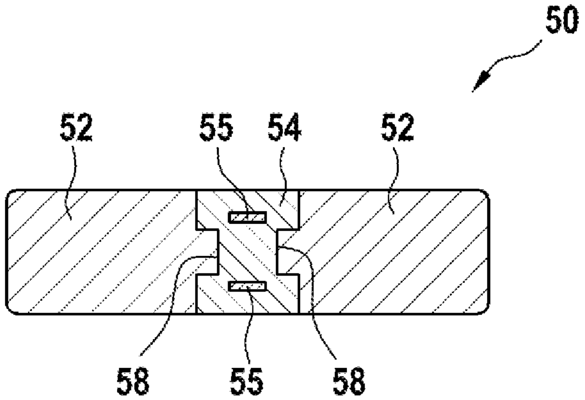

Furthermore, the key shank 50 comprises the insert element 54, in particular made of plastic. This insert element 54 is inserted between the two shank legs 52. In particular, the sectional representation C-C in FIG. 7 illustrates that the insert element 54 is located between the two shank legs 52 and is connected to both shank legs 52 via a tongue and groove connection 58.

Two transmission elements 55 extend inside the insert element 54. Since the key 1 is designed as a reversible key, at least two of these transmission elements 55 are provided.

In the region of the key shank 50, the two transmission elements 55 each have a locking device contact surface 56. The respective locking device contact surface 56 is exposed on the top surface of the key shank 50 and can thus be used for the transmission of data and/or power to the locking device 101.

Inside the key bow 2, the transmission elements 55 each have a printed circuit board contact surface 57 in order to connect the two transmission elements 55 to the printed circuit board 71 in an electrically conductive manner.

Furthermore, the socket 74 is located on the printed circuit board 71 and is designed here as a USB-C socket.

A wireless communication module 78, designed for near-field communication with the device 103, is located on the printed circuit board 71.

Figure 9:
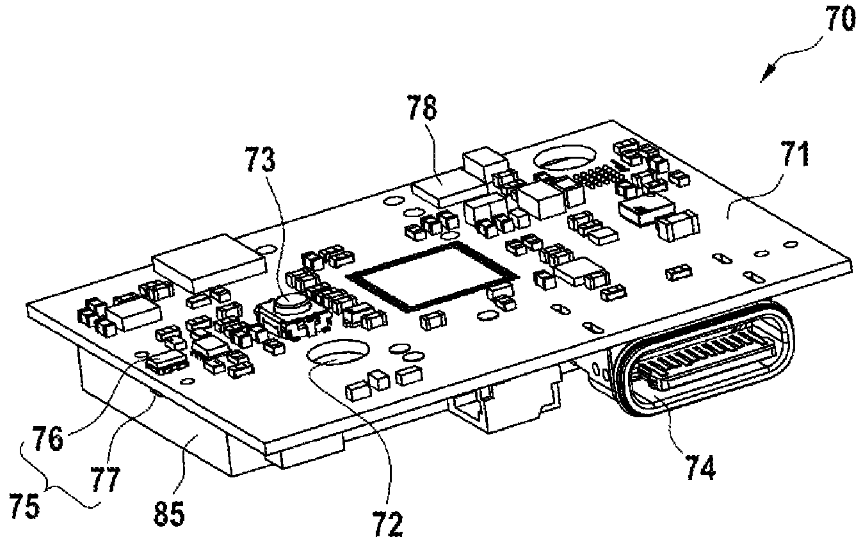

FIG. 9 also illustrates that an energy storage device 85 to power the electronics 70 and/or the locking device 101 is arranged inside the key bow 2. This energy storage device 85 can be charged via the socket 74, for example.

The button 73 is to be actuated in order to communicate with the device 103 via the near-field communication. If the button 73 has not been pressed shortly beforehand, the wireless communication module 78 sleeps, so that electrical energy of the energy storage device 85 can be saved.

Also to save energy, the electronics 70 can be woken up when the transmission element 55 comes into contact with corresponding contact points of the lock cylinder 101. Thus, inserting the key 1 into the lock cylinder 101 can cause an action, in particular to transmit data to the lock cylinder. If the key is removed again, this can also trigger an action; data is preferably transmitted from the key 1 to the device 103.

If the button 73 has not been pressed and the transmission elements 55 have been out of contact with the corresponding contact points of the lock cylinder 101 for a long time, the electronics 70 are idle.

Furthermore, FIG. 9 illustrates that a light device 75 is arranged on the printed circuit board 71. In the exemplary embodiment shown, this light device 75 comprises a first light element 76 in the form of an LED on one side of the printed circuit board 71 and a second light element 77 in the form of an LED on the opposite side of the printed circuit board 71. The first light element 76 is arranged to feed light into the first light guide 26. The second light element 77 is arranged to feed light into the second light guide 27. In particular, the two light elements are actuated synchronously so that they both emit the same pattern.

The two light elements 76, 77 are, in particular, LEDs that can light up in a plurality of colors. In addition, the electronics 70 are designed to actuate the light device 75, i.e. the two light elements 76, 77, to reproduce at least one item of information in a luminous manner.

Figure 12:
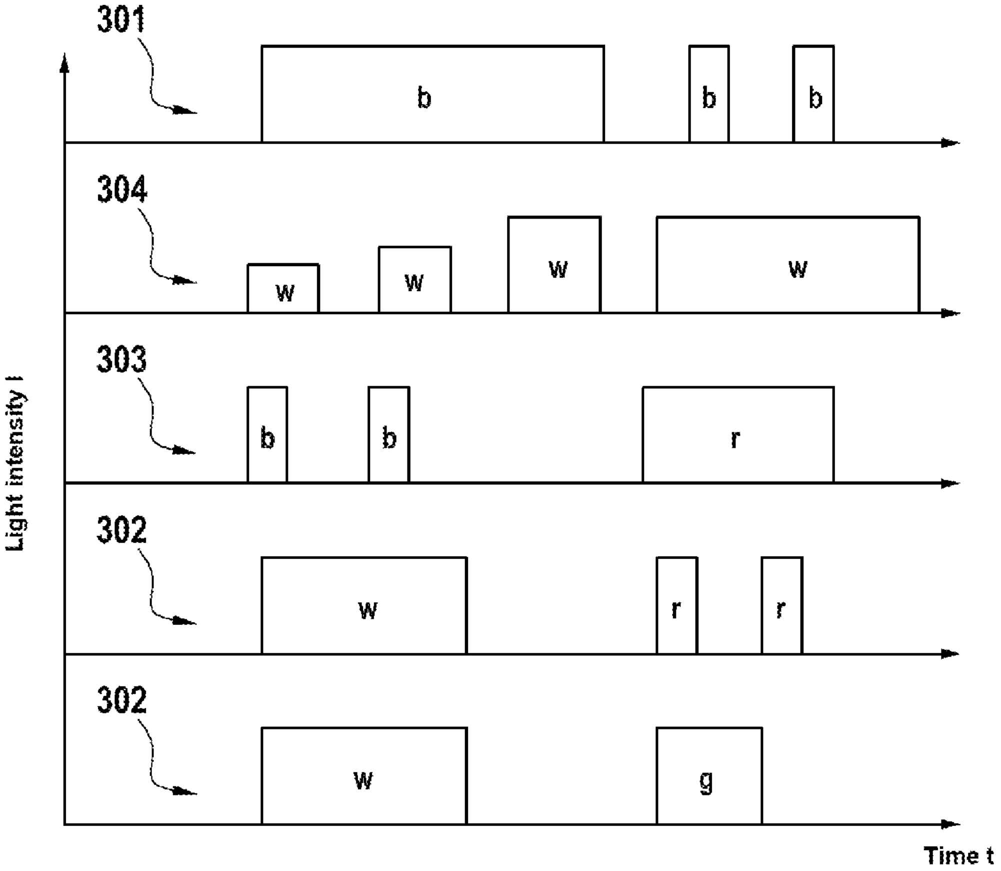

FIG. 12 shows an example of the patterns in terms of light color, intensity and flashing pattern for different trigger events. Accordingly, e.g. when pressing 301 the button 73, blue light (b) with a flashing pattern "long", "short", "short" can be emitted. The "long" signal represents the connection setup, the "short" and "short" signals represent the existing connection. This means that connection setup and existing connection are represented differently.

When connecting 304 a charging cable with the socket 74 e.g. white light (w) can be emitted, with both the light intensity and the duration of the individual light signals being able to increase over time. An interrupted pattern can in this case represent the charging process and a sustained light the fully charged state.

When the key 1 is removed 303 from the locking device 101, blue (b) can be flashed twice and red (r) once, for example, with the two blue light signals being short and the red light signal being long. The blue light signals indicate the connection to the device 103. The red light signal indicates a disruption. If there is no disruption, only the blue light is emitted.

For an insertion 302 of the key 1 into the locking device 101, two different patterns are provided, for example, which represent a combination of information. In the combination "white" (w) "green" (g), "white" stands for a low charge status of the energy storage device and "green" for an access right. In the combination "white-red-red", "white" stands for a low charge status of the energy storage device and "red-red" for a denied access right. If the energy storage device is sufficiently charged, the key will only emit the pattern "green" if access is granted and "red-red" if access is denied.

Figure 10:
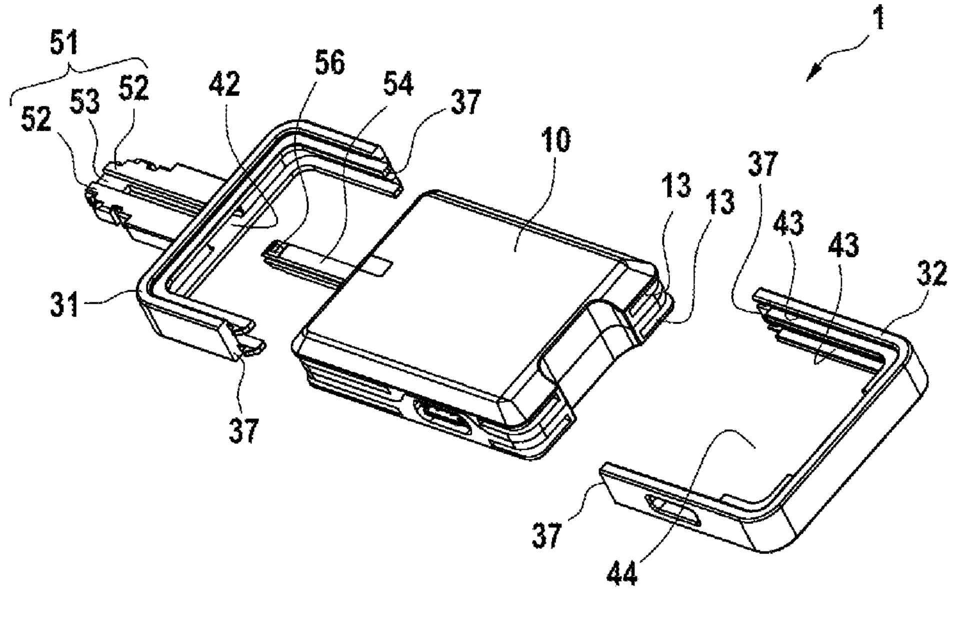

FIG. 10 illustrates a state during the assembly of the key 1 according to the disclosure. Accordingly, the two housing parts 11, 12 are first placed one on top of the other. The electronics 70, in particular also the energy storage device 85, are thereby already located between the two housing parts 11, 12. Furthermore, the insert element 54 is inserted between the two housing parts 11, 12.

In order to press the two housing parts 11, 12 firmly onto one another and thereby in particular to compress the seal 28, the described rail holders 13 are provided in the two housing parts 11, 12, which are pushed into the associated rails 43 of the two frame parts 31, 32. The two frame parts 31, 32 can be pushed onto the housing 10 at the same time or one after the other.

During this assembly process, the insert element 54 already connected to the housing 10 is inserted through an insert element through-opening 42 in the first frame part 31 and can thus be inserted between the two shank legs 52.

Figure 11:
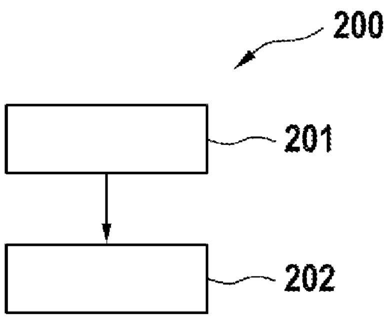

FIG. 11 illustrates an assembly method 200 for this exemplary embodiment. In this case, the electronics 70 and the energy storage device 85 are initially surrounded by the housing 10 in an assembly method step a) 201. In an assembly method step b) 202, the housing 10 is then fastened to the frame 30.

In the assembly method step b) 202, the rail holders 13 are pushed into one another with the rails 43 and at the same time the insert element 54 is pushed into the key shank main body 51.

The invention claimed is:

1. A key for an electromechanical locking device, with a key bow, wherein the key bow comprises a housing, a frame that is separate from the housing, and a single button, wherein the housing is surrounded by the frame, wherein the frame is made of metal or fiber-reinforced plastic, and wherein the housing comprises an actuating section configured to actuate the button and a support section configured to support the actuating section, wherein the actuating section and the support section are designed in one piece with one another, wherein the housing comprises a support column to limit a travel upon actuation of the actuating section.

2. The key according to claim 1, wherein the key bow comprises a broad side and the actuating section occupies at least 20% of the extension of the broad side, and/or wherein the housing comprises a flat end surface and the actuating section occupies at least 30% of the extension of the end surface.

3. The key according to claim 1, wherein the actuating section and the support section are formed monolithically in relation to one another, as an injection molded part.

4. The key according to claim 1, wherein the actuating section and the support section merge into one another in a common, flat, end surface of the housing.

5. The key according to claim 1, wherein the actuating section and the support section differ at least partially in an internal wall thickness of the housing and/or wherein the actuating section has a changing wall thickness.

6. The key according to claim 1, wherein the one-piece, support section forms the housing on a narrow side of the key bow.

7. The key according to claim 1, wherein the support column comprises a first support column part and a separately formed second support column part.

8. The key according to claim 1, wherein the button is arranged on a printed circuit board, wherein the circuit board comprises a column recess for the support column.

9. The key according to claim 1, wherein the housing comprises a first housing part and a second housing part, wherein the first housing part, the first support column part and the second housing part comprises the second support column part.

10. The key according to claim 9, wherein the button is configured to be actuated by pressing the first and second housing parts against one another.

11. The key according to claim 1, wherein the key bow comprises electronics with a wireless communication module for wireless communication, near-field communication, with a device; wherein the electronics are designed such that when the button is actuated, communication with the device begins.

12. The key according to claim 1, wherein the housing is surrounded by a frame, wherein the support section is partially located in the frame, and/or wherein the first and the second housing part are surrounded by the frame, and/or wherein the frame is designed to arrange the first and the second housing part on one another.

13. The key according to claim 12, wherein the frame is designed to transmit a torque to the locking device.

14. The key according to claim 1, wherein the key comprises a key shank, wherein the key shank is rigidly connected to the key bow, to the frame.

15. The key according to claim 14, wherein the key shank comprises at least one transmission element for the transmission of electrical energy and/or data to the locking device, wherein the electronics are designed such that insertion and/or removal of the key shank into/from the locking device causes the electronics to perform an action.

16. The key according to claim 1, wherein the key bow comprises at least one light device, wherein the light device is designed to display differently, a communication setup and/or communication with the device.

* * * * *